US009727428B2

(12) United States Patent
Tsirkin

(10) Patent No.: US 9,727,428 B2
(45) Date of Patent: Aug. 8, 2017

(54) REVERSE NETWORK ADDRESS TRANSLATION FAILOVER

(71) Applicant: Red Hat Israel, Ltd., Ra'anana (IL)

(72) Inventor: Michael Tsirkin, Yokneam Illit (IL)

(73) Assignee: Red Hat Israel, Ltd., Ra'anana (IL)

( * ) Notice: Subject to any disclaimer, the term of this patent is extended or adjusted under 35 U.S.C. 154(b) by 67 days.

(21) Appl. No.: 14/953,636

(22) Filed: Nov. 30, 2015

(65) Prior Publication Data

US 2017/0153952 A1    Jun. 1, 2017

(51) Int. Cl.
  *G06F 11/00* (2006.01)
  *G06F 11/20* (2006.01)
  *H04L 29/12* (2006.01)

(52) U.S. Cl.
  CPC ........ *G06F 11/2007* (2013.01); *H04L 61/255* (2013.01); *H04L 61/2575* (2013.01); *G06F 2201/805* (2013.01)

(58) Field of Classification Search
  CPC .................................................... G06F 11/2007
  USPC ................ 714/4.11, 4.12, 4.21, 4.3, 4.5, 5.1
  See application file for complete search history.

(56) References Cited

U.S. PATENT DOCUMENTS

| | | | |
|---|---|---|---|
| 5,016,244 A | 5/1991 | Massey, Jr. et al. | |
| 6,108,300 A * | 8/2000 | Coile | G06F 11/2005 340/2.9 |
| 6,512,774 B1 * | 1/2003 | Vepa | H04L 69/40 370/242 |
| 6,560,630 B1 * | 5/2003 | Vepa | H04L 29/12839 709/250 |
| 6,766,373 B1 | 7/2004 | Beadle et al. | |
| 6,938,092 B2 * | 8/2005 | Burns | H04L 45/00 709/200 |
| 7,096,383 B2 | 8/2006 | Talaugon et al. | |
| 7,127,524 B1 * | 10/2006 | Renda | H04L 29/12 709/223 |
| 7,518,987 B2 * | 4/2009 | Biswas | H04L 29/12094 370/221 |

(Continued)

OTHER PUBLICATIONS

Nordstrom et al., "Serval: An End-Host Stack for Service-Centric Networking", Princeton University, excerpt from https://www.usenix.org/system/files/conference/nsdi12/nsdi12-final33.pdf (14 pages).

(Continued)

*Primary Examiner* — Dieu-Minh Le
(74) *Attorney, Agent, or Firm* — K&L Gates LLP

(57) ABSTRACT

In an example system, a first interface has a first address and a first port number. A second interface has a second address and a second port number. A router is in communication with the first and second interfaces over a network. The router is configured to request, a first set of failover information from the first interface. The router is further configured to receive the first set of failover information from the first interface. The first set of failover information includes the second address and the first port number. The router is configured to detect a failure on the first interface. The router is further configured to modify a network access translation (NAT) table stored within the router by replacing the first address of the first interface with the second address of the second interface while retaining the first port number, such that the first port number remains unchanged.

20 Claims, 4 Drawing Sheets

(56) References Cited

U.S. PATENT DOCUMENTS

| | | | |
|---|---|---|---|
| 8,132,247 | B2 | 3/2012 | Adhya et al. |
| 8,285,881 | B2* | 10/2012 | Elzur ...................... H04L 47/10 |
| | | | 709/250 |
| 8,341,289 | B2 | 12/2012 | Hellhake et al. |
| 2008/0267186 | A1* | 10/2008 | Boukis .............. H04L 29/12367 |
| | | | 370/392 |
| 2012/0084368 | A1* | 4/2012 | Go ........................ H04L 9/0822 |
| | | | 709/206 |
| 2012/0113800 | A1 | 5/2012 | Arsenault et al. |
| 2013/0286942 | A1 | 10/2013 | Bonar et al. |
| 2015/0006951 | A1* | 1/2015 | Gurram ............... G06F 11/2028 |
| | | | 714/4.12 |

OTHER PUBLICATIONS

Su, "Move: Mobility with Persistent Network Connections", 2004, Columbia University, excerpt from http://systems.cs.columbia.edu/files/wpid-suthesis.pdf (261 pages).

"Security—Configuration and Management", Sep. 7, 2009, excerpt from https://downloads.avaya.com/css/P8/documents/100107964 (350 pages).

* cited by examiner

| Interface | Source port | Source address | Destination port | Destination address | Protocol |
|---|---|---|---|---|---|
| A | Port 204A 2258 | Address 206A 192.168.0.11 | Port 208A 21 | Address 210A 206.73.118.180 | 212A TCP |
| B | Port 204B 5000 | Address 206B 157.54.35.39 | Port 208B 88 | Address 210B 206.75.18.11 | 212B TCP |
| C | Port 204C 5250 | Address 206C 192.168.2.2 | Port 208C 21 | Address 210C 206.73.118.180 | 212C TCP |

FIG. 2

REVERSE NETWORK ADDRESS TRANSLATION FAILOVER

BACKGROUND

A variety of different types of network devices often communicate with each other over a network. Network devices may include endpoints, which are devices or nodes that are connected to a network and accept communication back and forth across a network. Each network device typically includes one or more interfaces that send and receive data packets routed through a network device such as a router over the network. It is common in modern networking configurations for an endpoint to support multiple networking interfaces. However, an interface failure or network device failure may occur, which may cause traffic routed through the network device or router to be interrupted.

SUMMARY

The present disclosure provides a new and innovative system, methods and apparatus for reverse network address translation failover. In an example embodiment, a system includes a first interface, a second interface, and a router. The first interface has a first address and a first port number. The second interface has a second address and a second port number. The router is in communication with the first interface and the second interface over a network. The router is configured to request, at a first time, a first set of failover information from the first interface. Responsive to the request at the first time, the router is further configured to receive the first set of failover information from the first interface. The first set of failover information includes the second address and the first port number. The router is further configured to detect, at a second time after the first, a failure on the first interface. Responsive to detecting the failure on the first interface, the router is further configured to modify a network access translation (NAT) table stored within the router by replacing the first address of the first interface with the second address of the second interface while retaining the first port number, such that the first port number remains unchanged.

An example method for transferring network traffic from a first interface to a second interface includes requesting, at a first time, by a network device in a network, a first set of failover information from the first interface. The first interface has a first address and a first port number. The method further includes, responsive to the request at the first time, receiving, by the network device in the network, the first set of failover information from the first interface. The first set of failover information includes the second address and the first port number. The method further includes detecting, at a second time after the first time, by at least one of the network device, the first interface, and the second interface, a failure on the first interface. The method further includes, responsive to detecting the failure on the first interface, modifying, by a router, a network access translation (NAT) table stored within the router. The first address of the first interface is replaced, by the router, with the second address of the second interface, and the first port number remains unchanged.

An example non-transitory machine readable medium stores a program, which, when executed by a processor, causes at least one of a network device, a router, a first interface, and a second interface to request, at a first time, by the network device in a network, a first set of failover information from the first interface. The first interface has a first address and a first port number. The non-transitory machine readable medium causes the network device to, responsive to the request at the first time, receive the first set of failover information from the first interface. The first set of failover information includes the second address and the first port number. The non-transitory machine readable medium causes at least one of the network device, the first interface, and the second interface to detect, at a second time after the first time, a failure on the first interface. The non-transitory machine readable medium cases the router to, responsive to detecting the failure on the first interface, modify, by the router, a network access translation (NAT) table stored within the router. The first address of the first interface is replaced, by the router, with the second address of the second interface, and the first port number remains unchanged.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 2 illustrates a block diagram of an example NAT table according to an example embodiment of the present disclosure.

DETAILED DESCRIPTION OF EXAMPLE EMBODIMENTS

Techniques are disclosed for providing reverse network access translation (NAT) failover for network devices. Typically, in modern networking configurations, endpoints may support multiple networking interfaces. As described herein, a network interface may be referred to simply as an interface, for brevity. An endpoint may be for example, a modem, hub, bridge, or network device. In an example embodiment, a network device may have multiple interfaces (e.g., a laptop may have a wifi, ethernet, and bluetooth connection). Generally, bonding may be utilized so that if one interface fails, another interface may be used as a fail-over. However, bonding may be problematic because if the interfaces have different IP addresses, switching to a different interface breaks existing connections. Thus, the present disclosure provides reverse NAT failover for interfaces that have different IP addresses, which advantageously allows the interfaces and network devices to receive traffic without being interrupted by the failure of an interface.

Typically, providing uninterrupted traffic between network devices requires a switch to an entirely different NAT router after a failure occurs. However, the present disclosure advantageously allows a network interface (e.g., in an endpoint or network device) failure to switch to a different network interface without the need of switching to a different NAT router. For example, the addresses of the interfaces may be updated in the NAT router's NAT table and the port numbers may remain unchanged thereby allowing other network devices to observe the same IP addresses and port numbers.

In an example embodiment, a first interface and a second interface may communicate via a router. Each interface has a designated address and port number. The interfaces may establish failover information such that if the first interface fails, the data designated to be sent to the address of the first interface gets sent to the address of the second interface. This is achieved by updating the addresses to the failover addresses in an NAT table in the router once a failure occurs. For example, if a failure occurs on the first interface, the router may detect the failure and update the NAT table by modifying the address of the first interface to an address provided by the failover information of the first interface. This enables data to continually be routed through the router without interrupting traffic. For example, data that would originally be sent to the address and port number of the first interface is now sent to the address provided by the failover information of the first interface at the same port number. This will work even if the interfaces have different addresses (e.g., IP addresses) without breaking any existing connections.

Figure 1:
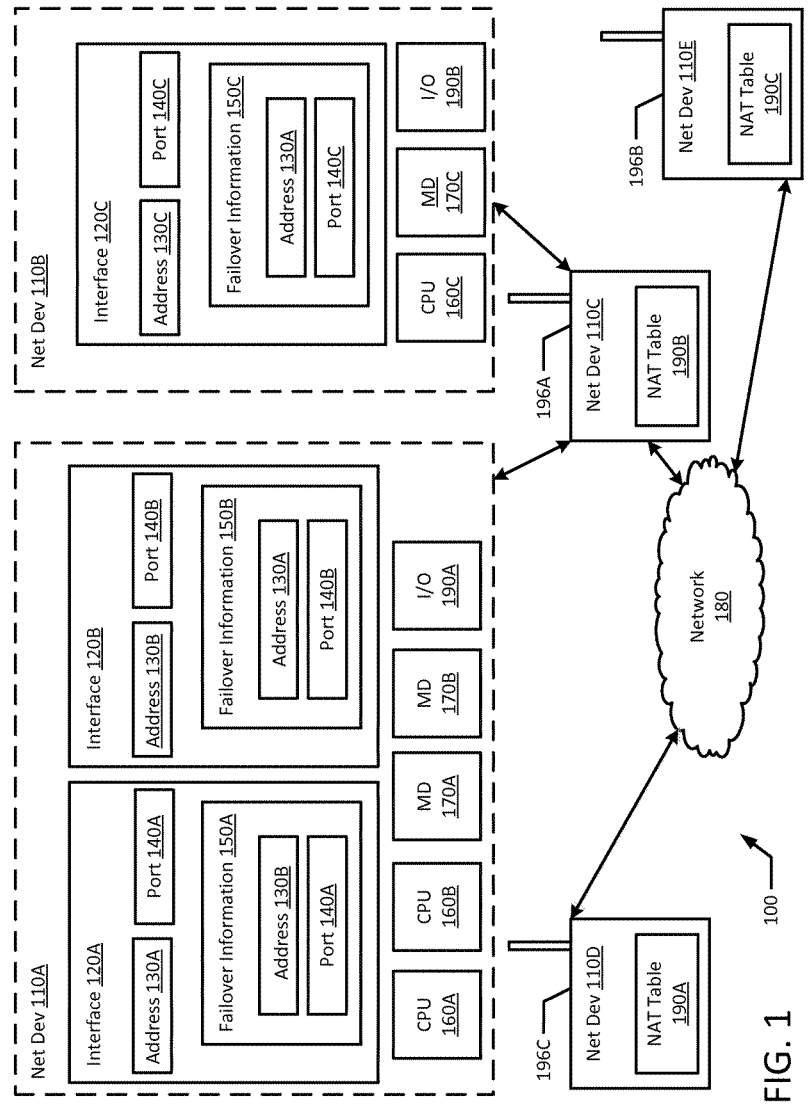
FIG. 1 illustrates a block diagram of an example reverse NAT failover system according to an example embodiment of the present disclosure.

FIG. 1 depicts a high-level component diagram of an example reverse NAT failover system 100 in accordance with one or more aspects of the present disclosure. The reverse NAT failover system 100 may include one or more network devices 110A-E. The network devices may be computers, printers, routers, etc. Each network device may include one or more interfaces 120A-C. Each interface may be associated with an address 130A-C and port number 140A-C. Additionally, each network device may include a set of failover information 150A-C. Each network device 110A-E may in turn include one or more physical processors (e.g., CPU 160A-C) communicatively coupled to memory devices (e.g., MD 170A-C) and input/output devices (e.g., I/O 190A-B). In an example embodiment, a network device may be implemented as a virtual machine (e.g., a virtual router).

A computer or CPU may run a virtual machines by executing a software layer above a hardware and below the virtual machine. A virtual machine may be presented a virtualized physical layer, including processors, memory, and I/O devices. For example, a virtual machine may include virtual processors, virtual memory devices, and/or virtual I/O devices. A virtual machine may execute a guest operating system, which may utilize the virtual processors, virtual memory devices, and/or virtual I/O devices. Additionally, a virtual machine may include one ore more applications that urn on the virtual machine under the guest operating system.

As used herein, a physical processor or processor (e.g., CPU 160A-C) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 170A-C refers to a volatile or non-volatile memory device, such as RAM, ROM, EEPROM, or any other device capable of storing data. As discussed herein, I/O device 190A-B refers to a device capable of providing an interface between one or more processor pins and an external device capable of inputting and/or outputting binary data.

In an example embodiment, the network devices 110A-B (e.g., printers, personal computers, servers, etc.) and network devices 110C-E (e.g., routers 196A-C) may communicate via a network 180. For example, the network 180 may be a public network (e.g., the Internet), a private network (e.g., a local area network (LAN) or wide area network (WAN)), or a combination thereof. In an example embodiment, network device 110A may communicate with network device 110B via network device 110C (e.g., router 196A) wirelessly via the Internet, or network device 110A may communicate with network device 110C (e.g., router 196A) via an ethernet connection while network device 110B communicates to network device 110C (e.g., router 196A) wirelessly via the internet. For example, a user of network device 110A may be sending information to and receiving information from network device 110B by establishing a connection with network device 110C (e.g., router 196A) via the network 180. In an example embodiment, the network devices (110A-B) and network device 110C (e.g., router 196A) may all communicate wirelessly via the Internet. In an example embodiment, the network devices (110A-B) and the network device 110C (e.g., router 196A) may all communicate via a wired connection.

In an example embodiment, network devices 110C-E (e.g., routers 196A-C) may include network access translation (NAT) tables (e.g., NAT tables 190A-C). The NAT tables 190A-C are described in more detail in relation to FIG. 2 below.

FIG. 2 illustrates an example network access translation table 200. In an example embodiment, the network access translation table 200 may include table entries 202A-C for each interface 120A-C. In an example embodiment, the network access translation table 200 may include source ports 204A-C, source addresses 206A-C, destination ports 208A-C, destination addresses 210A-C and protocols 212A-C. For example, a first interface 120A (e.g., interface A) may have a source port 204A (e.g., 2258) and a source address 206A (e.g., 192.168.0.11). Additionally, the first interface 120A (e.g., interface A) may have a destination port 208A (e.g., 21) and a destination address 210A (e.g., 206.73.118.180). The network address translation table 200 may also include the protocol 212A for the first interface 120A (e.g., transmission control protocol (TCP)). In an example embodiment, a network address translation table 200 includes more or less interfaces than illustrated in FIG. 2.

Figure 3:
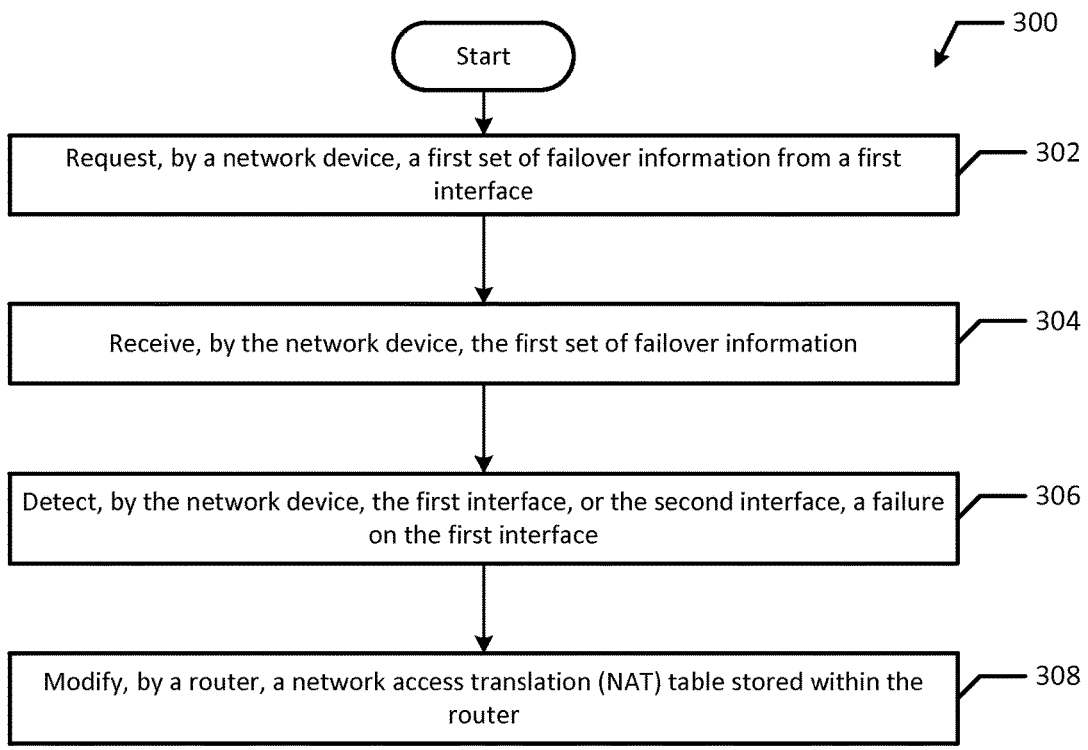
FIG. 3 illustrates a flowchart of an example process for reverse NAT failover according to an example embodiment of the present disclosure.

FIG. 3 illustrates a flow diagram of an example method 300 for reverse NAT failover in accordance with an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

In the illustrated embodiment, a network device requests a first set of failover information from a first interface (block 302). For example, a network device 110A-C may request a first set of failover information 150A from a first interface 120A. In an example embodiment, network device 110A may be communicating to network device 110B through network device 110C (e.g., router 196A). Network device 110B or network device 110C (e.g., router 196A) may request the first set of failover information 150A from the first interface 120A. Each network device 110A-B may include one or more interfaces 120A-C, each of which have an address 130A-C and port number 140A-C. Then, the network device receives the first set of failover information (block 304). In an example embodiment, network device 110C (e.g., router 196A) may receive the first set of failover information 150A from the network device 110A. In another example embodiment, network device 110B may receive the first set of failover information 150A from network device 110A. The first set of failover information 150A of a first interface 120A may include the address of a different interface and the same port number (e.g., port number 140A) as the first interface 120. For example, communication between network device 110A and other devices on the network through network device 110C (e.g., router 196A) may utilize interfaces 120A-B on network device 110A. The first interface 120A may provide failover information to network device 110C (e.g., router 196A) that includes the address of the second interface 120B to ensure that the network device 110C (e.g., router 196A) may continue to route data if the first interface 120A fails. For example, the first interface 120A may have an address 130A (e.g., 192.168.0.11) and a port number 140A (e.g., 2258). The second interface 120B may have an address 130B (e.g., 157.54.35.39) and a port number 140B (e.g., 5000). For example, the first set of failover information 150A received at the network device 110C (e.g., router 196A) for the first interface 120A will include the address 130B (e.g., 157.54.35.39) and the port number 140A (e.g., 2258). Each interface may have its own failover information. For example, the interface 120C may have failover information 150C, which may be used to update a NAT table (e.g., NAT table 190B) if a failure is detected on interface 120C.

The network device, the first interface, or the second interface may detect a failure on the first interface (block 306). In an example embodiment, the first interface 120A may fail and the failure may be detected by any of the first interface 120A, the second interface 120B, network device 110A, and/or network device 110C (e.g., router 196A). For example, the first interface 120A, the second interface 120B, network device 110A, or network device 110C (e.g., router 196A) may detect a link failure. In another example embodiment, the failure may be a timeout of a keepalive signal. For example, the keepalive signal may be sent between the network device 110A and the first interface 120A. Additionally, the failure may be a lack of an acknowledgment (ACK) flag in a Transmission Control Protocol (TCP) packet received by the network device (e.g., network device 110A) from the first interface (e.g., interface 120A). A router modifies a network access translation (NAT) table stored within the router (block 308). In an example embodiment, after the failure is detected, the router 196A may modify a NAT table 190B stored within the router 196A. For example, the router 196A may modify the addresses in the NAT table 190B with the failover information (e.g., failover information 150A). For example, by replacing the address 130A (e.g., 192.168.0.11) with address 130B (e.g., 157.54.35.39) for the first interface 120A, data originally designated to be routed to interface 120A is now routed to the updated address 130 B (e.g., 157.54.35.39) provided by the failover information 150A. Thus, the data path is advantageously switched to a different interface without breaking connections and without interrupting traffic.

Network device 110A may also communicate with network device 110D through network device 110C (e.g., router 196A) over a network 180A. Additionally, network device 110A may communicate with network device 110B through network device 110C (e.g., router 196A). In an example embodiment, interface 120A of network device 110A may communicate with interface 120C of network device 110B through router 196A. In an example embodiment, the network device 110A may request failover information from interface 120A and/or 120C. Additionally, network device 110C may request failover information from interface 120A and/or 120C. For example, router 196A may request failover information from interface 120A and 120C. For example, interface 120C may have an address 130C (e.g., 192.168.2.2) and a port number 140C (e.g., 5250). The network device (e.g., network device 110A-C) may request a first set of failover information from the first interface (e.g., interface 120A). Then, the network device (e.g., network device 110A-C) may receive the first set of failover information which may include address 130C (e.g., 192.168.2.2) and port number 130A (e.g., 2258). The network device (e.g., network device 110A-C) may also request a second set of failover information from the second interface (e.g., interface 120C). The second set of failover information may include address 130A (e.g., 192.168.0.11) and port number 140C (e.g., 5250). The network device (e.g., network device 110A-C) may also detect a failure on the first interface (e.g., interface 120A) or the second interface (e.g., interface 120C). In an example embodiment, the failure may be a link failure, the timeout of a keepalive signal, or a lack of an ACK flag in a TCP packet received by the network device (e.g., network device 110A-C) from the first interface (e.g., interface 110A) or the second interface (e.g., interface 110C). After a failure is detected, the router (e.g., router 196A) may modify a NAT table (e.g., NAT table 190B) stored within the router (e.g., router 196A). For example, the router 196A may modify the addresses in the NAT table 190B with the failover information (e.g., failover information 150C). By replacing the address 130C (e.g., 192.168.2.2) with address 130A (e.g., 192.168.0.11) for the second interface (e.g., interface 120C), data originally designated to be routed to interface 120C is now routed to the updated address 130A (e.g., 192.168.0.11) provided by the failover information 150C. In contrast to bonding, which only supports fail-over for interfaces that have the same IP address, the present disclosure advantageously allows for fail-over between interfaces with different IP address (e.g., interfaces 120A-C) without breaking an existing connection.

In an example embodiment, the network device (e.g., network device 110A-E) may send a secure random cookie when requesting a set of failover information (e.g., failover information 150A-C). For example, network device 110C (e.g., router 196A) may send a secure random cookie to network device 110A when requesting a set of failover information (e.g., failover information 150A) for interface 120A. Similarly, the network device that received the secure random cookie may send an associated secure random cookie to the failover information requestor. For example, network device 110C (e.g., router 196A) may send a secure random cookie with a request for failover information from interface 120A on network device 110A. Then, network device 110A may send a first set of failover information (e.g., failover information 150A) to network device 110C (e.g., router 196A) with an associated secure random cookie. In an example embodiment, the secure random cookie may be sent with the request. In another example embodiment, the secure random cookie may be sent before the request or after the request.

Figure 4:
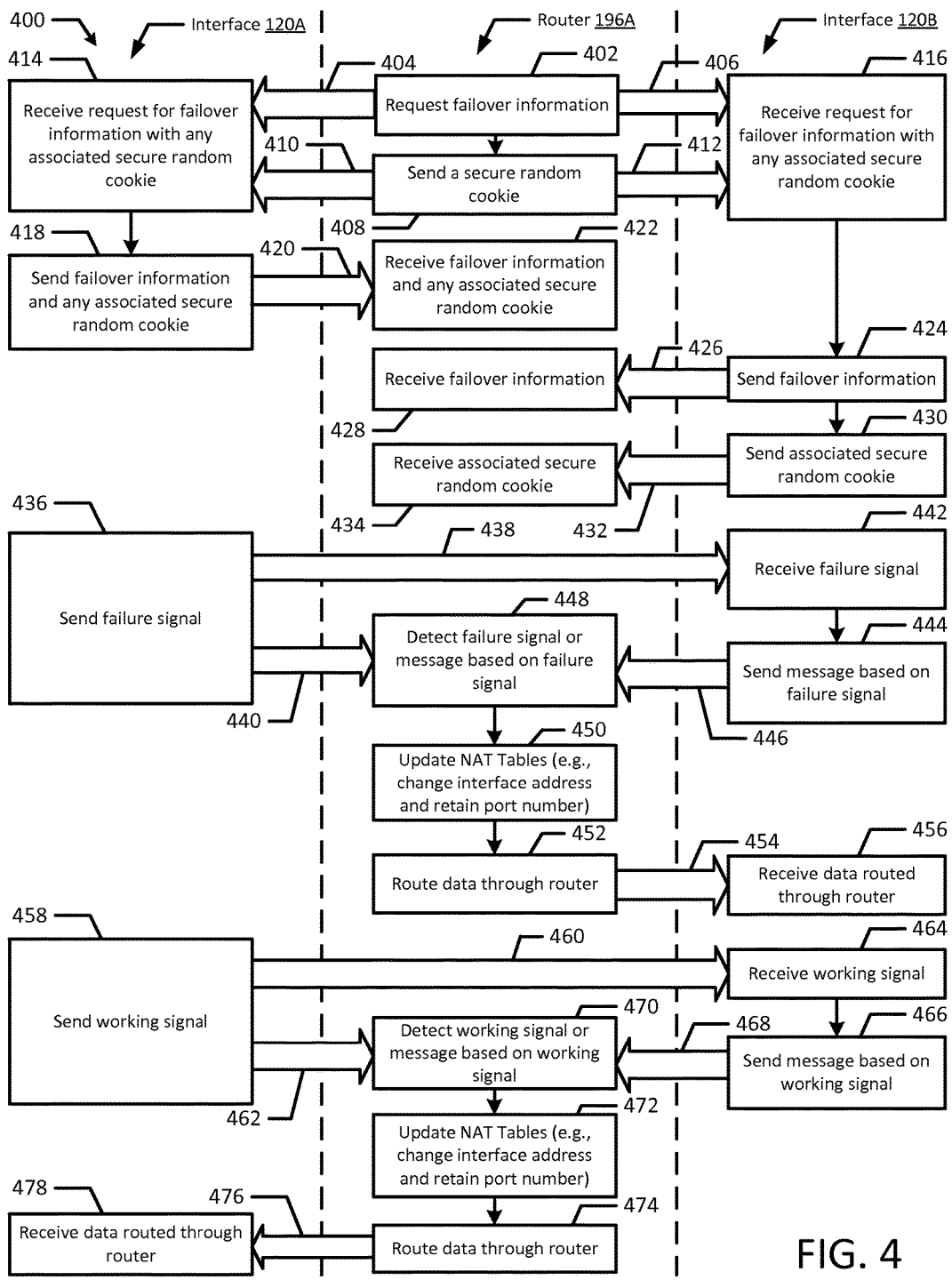
FIG. 4 illustrates a flow diagram of an example process for reverse NAT failover according to an example embodiment of the present disclosure.

FIG. 4 depicts a flow diagram illustrating an example method 400 of reverse NAT failover according to an example embodiment of the present disclosure. Although the example method 400 is described with reference to the flowchart illustrated in FIG. 4, it will be appreciated that many other methods of performing the acts associated with the method may be used. For example, the order of some of the blocks may be changed, certain blocks may be combined with other blocks, and some of the blocks described are optional. The method may be performed by processing logic that may comprise (e.g., circuitry, dedicated logic, etc.), software, or a combination of both.

In the illustrated example embodiment, a network device requests failover information (blocks 402 to 406). For example, the router 196A may request a first set of failover information 150A from a first interface 120A. Additionally, the router 196A may request a second set of failover information 150B from a second interface 120B. In an example embodiment, the router 196A may request the first set of failover information 150A and the second set of failover information 150B at the same time or at different times. The network device may also send a secure random cookie associated with the request (blocks 408 to 412). For example, the router 196A may send a secure random cookie associated with the request for the first set of failover information 150A and/or the second set of failover information 150B. The first interface receives the request for failover information and any associated secure random cookie (block 414). For example, the first interface 120A may receive the request for failover information from the router 196A and any associated secure random cookie sent by the router 196A with the request. Similarly, the second interface may receive the request for failover information and any associated secure random cookie (block 416). For example, the second interface 120B may receive the request for failover information from the router 196A and any associated secure random cookie sent by the router 196A.

Then, the first interface may send failover information and any associated secure random cookie to the network device (blocks 418 and 420). For example, the first interface 120A may send failover information 150A to the router 196A. The failover information 150A may include an address 130B (e.g., 157.54.35.39) and a port number 140A (e.g., 2258). For example, the failover information may include the address of the second interface 120B such that if a failure occurs on the first interface 120A, data will be routed to the address of the second interface 120B. Additionally, interface 120A may send an associated secure random cookie to the router 196A. The secure random cookie may be sent with the response to the failover information request, or it may be sent at a time before or after the failover information is sent. Then, the network device may receive the failover information and the associated secure random cookie (block 422). For example, router 196A may receive failover information 150A from interface 120A. Similarly, the second interface may send failover information to the network device (blocks 424 and 426). For example, the second interface 120B may send failover information 150B to the router 196A). The failover information 150B may include an address 130A (e.g., 192.168.0.11 and a port number 140B (e.g., 5000). For example, the failover information may include the address of the first interface 120A such that if a failure occurs on the second interface 120B, data will be routed to the address of the first interface 120B. The network device may receive the failover information associated with the second interface (block 428). For example, router 196A may receive the failover information 150B from the second interface 120B. The second interface may also send an associated secure random cookie to the network device (blocks 430 and 432). For example, the second interface 120B may send a secure random cookie associated with the request for failover information. The network device may receive the associated secure random cookie (block 434). For example, router 196A may receive the secure random cookie associated with the request for failover information, the secure random cookie may ensure that the failover information (e.g., failover information 150B) is not modified by malicious programs before it is received by the router 196A.

The first interface may fail and send a failure signal to the second interface (blocks 436 and 438). For example, the first interface 120A may send a failure signal to the second interface 120B due to a failure of the first interface 120A. In an example embodiment, the failure may be a link failure. The first interface may also send a failure signal to the network device (blocks 436 and 440). For example, the first interface 120A may send a failure signal to the router 196A due to a failure of the first interface 120A. The first interface may receive the failure signal (block 442). For example, the first interface 120A may receive the failure signal such as a timeout of a keepalive signal sent between the network device 110A and the router 196A. In another example embodiment, the failure signal may be a lack of an ACK flag in a TCP packet. The second interface may send a message based on the failure signal to the network device (blocks 444 and 446).

For example, the second interface 120B may send a message based on the failure signal to the router 196A. The message may be a data packet indicating that a failure has occurred on the second interface 120B. Additionally, the network device 110A may send the message based on the failure signal to router 196A. The network device may detect the failure signal and any associated message based on the failure signal (block 448). For example, router 196A may detect the failure signal and receive any associated message based on the failure signal from the interfaces (e.g., interface 120A-B) and/or network device 110A.

Then, a router may update NAT tables (block 450). In an example embodiment, the router 196A may update NAT table 190B by changing interface addresses while the port numbers remain unchanged. For example, the router 196A may update the address (e.g., 192.168.0.11) of the first interface 120A in NAT table 190B to the address provided in the failover information 150A (e.g., update address 192.168.0.11 to 157.54.35.39). Similarly, the router 196A may update the address (e.g., 157.54.35.39) of the second interface 120B in NAT table 190B to the address provided in the failover information 150B (e.g., update address 157.54.35.39 to 192.168.0.11). Then, the router may continue to route data (blocks 452 and 454). In an example embodiment, the router 196A may continue to route data to the updated addresses in NAT table 190B even after a failure has occurred on an interface 120A. For example, the address in the NAT table 190B for the first interface 120A is updated in the NAT table from address 130A (e.g., 192.168.0.11) to address 130B (e.g., 157.54.35.39). Thus, even though interface 120A may have failed, the data is now routed to the updated address 130B (e.g., 157.54.35.39). The second interface may receive data routed through the router (block 456). In an example embodiment, after the NAT table 190B is updated by the router 196A, data is now routed to the second interface 120B.

Further, in an example embodiment, the first interface may recover from the failure and may send a working signal (blocks 458 to 462). For example, a keepalive signal between the first interface 120A and the network device (e.g., network device 110A or network device 110C) may be reinitiated and the link restored. The second interface may receive the working signal (block 464). For example, the second interface 120B may receive the working signal from the first interface 120A. The second interface may send a message based on the working signal to the network device (blocks 466 and 468). For example, the second interface 120B may send a message based on the working signal to the router 196A. The network device may detect the working signal and any associated message based on the working signal (block 470). For example, a keepalive signal between the first interface 120A and the network device (e.g., network device 110A or network device 110C) may be reinitiated and the link restored. Once the link is restored, the router 196A may detect the working signal. Additionally, the router 196A may receive a message from the second interface 120B that the link between the network devices is restored. Then, a router may update the NAT tables (block 472). For example, the router 196A may change interface addresses while the port numbers remain unchanged. For example, the router 196A may update the failover address of the first interface 120A in NAT table 190B to the original address 130A (e.g., 192.168.0.11) of the first interface 120A. Similarly, the router 196A may update the address of the second interface 120B in NAT table 190B to the original address 130B (e.g., 157.54.35.39) of the second interface 120B. Then, the router may continue to route data through the router (blocks 474 and 476). For example, after the NAT table 190B is updated by the router 196A, data is now routed to the first interface 120A. The first interface may receive data routed through the router (block 478). In an example embodiment, after the NAT table 190B is updated by the router 196A, data is now routed to the first interface 120A as if a failure never occurred.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first example aspect of the present disclosure, a system includes a first interface, a second interface, and a router. The first interface has a first address and a first port number. The second interface has a second address and a second port number. The router is in communication with the first interface and the second interface over a network. The router is configured to request, at a first time, a first set of failover information from the first interface. Responsive to the request at the first time, the router is further configured to receive the first set of failover information from the first interface. The first set of failover information includes the second address and the first port number. The router is further configured to detect, at a second time after the first, a failure on the first interface. Responsive to detecting the failure on the first interface, the router is further configured to modify a network access translation (NAT) table stored within the router by replacing the first address of the first interface with the second address of the second interface while retaining the first port number, such that the first port number remains unchanged.

In accordance with another example aspect of the present disclosure, which may be used in combination with the preceding aspect, the router is further configured to request, a second set of failover information from the second interface. The second interface has a second address and a second port number. Responsive to the request, the router is further configured to receive, the second set of failover information from the second interface, wherein the second set of failover information includes the first address and the second port number.

In accordance with another example aspect of the present disclosure, which may be used in combination with any one or more of the preceding aspects, a network device includes one of the first interface and the second interface.

In accordance with another example aspect of the present disclosure, which may be used in combination with any one or more of the preceding aspects, the router is further configured to send a first secure random cookie with the request at the first time and a second secure random cookie with the request at the second time.

In accordance with another example aspect of the present disclosure, which may be used in combination with any one or more of the preceding aspects, the router is further configured to receive, from the first interface, the first secure random cookie with the response to the request at the first time and receive, from the second interface, the second secure random cookie with the response to the request at the second time.

In accordance with another example aspect of the present disclosure, which may be used in combination with any one or more of the preceding aspects, the failure is a link failure.

In accordance with another example aspect of the present disclosure, which may be used in combination with any one or more of the preceding aspects, the failure is a timeout of a keepalive signal sent between the network device and the first interface.

In accordance with another example aspect of the present disclosure, which may be used in combination with any one or more of the preceding aspects, the failure is a lack of an acknowledgment (ACK) flag in a Transmission Control Protocol (TCP) packet received by the network device from the first interface.

In a second example aspect of the present disclosure, a method for transferring network traffic from a first interface to a second interface includes requesting, at a first time, by a network device in a network, a first set of failover information from the first interface. The first interface has a first address and a first port number. The method further includes, responsive to the request at the first time, receiving, by the network device in the network, the first set of failover information from the first interface. The first set of failover information includes the second address and the first port number. The method further includes detecting, at a second time after the first time, by at least one of the network device, the first interface, and the second interface, a failure on the first interface. The method further includes, responsive to detecting the failure on the first interface, modifying, by a router, a network access translation (NAT) table stored within the router. The first address of the first interface is replaced, by the router, with the second address of the second interface, and the first port number remains unchanged.

In accordance with another example aspect of the present disclosure, which may be used in combination with any one or more of the preceding aspects, the method further includes method further includes requesting, by the network device in the network, a second set of failover information from the second interface. The second interface has a second address and a second port number. The method further includes, responsive to the request, receiving by the network device in the network, the second set of failover information from the second interface. The second set of failover information includes the first address and the second port number.

In accordance with another example aspect of the present disclosure, which may be used in combination with any one or more of the preceding aspects, requesting at the second time, by the network device, the second set of failover information, includes sending, by the network device, a second secure random cookie with the request at the second time.

In accordance with another example aspect of the present disclosure, which may be used in combination with any one or more of the preceding aspects, receiving, by the network device, the second set of failover information, includes receiving, from the second interface the second secure random cookie with the response.

In accordance with another example aspect of the present disclosure, which may be used in combination with any one or more of the preceding aspects, the network device is the router.

In accordance with another example aspect of the present disclosure, which may be used in combination with any one or more of the preceding aspects, the network device includes one of the first interface and the second interface.

In accordance with another example aspect of the present disclosure, which may be used in combination with any one or more of the preceding aspects, requesting at the first time, by the network device, the first set of failover information, includes sending, by the network device, a first secure random cookie with the request at the first time.

In accordance with another example aspect of the present disclosure, which may be used in combination with any one or more of the preceding aspects, receiving, by the network device, the first set of failover information, includes receiving, from the first interface the first secure random cookie with the response.

In accordance with another example aspect of the present disclosure, which may be used in combination with any one or more of the preceding aspects, the failure is a link failure.

In accordance with another example aspect of the present disclosure, which may be used in combination with any one or more of the preceding aspects, the failure is a timeout of a keepalive signal sent between the network device and the first interface.

In accordance with another example aspect of the present disclosure, which may be used in combination with any one or more of the preceding aspects, the failure is a lack of an acknowledgement (ACK) flag in a Transmission Control Protocol (TCP) packet received by the network device from the first interface.

In accordance with another example aspect of the present disclosure, which may be used in combination with any one or more of the preceding aspects, In a third example aspect of the present disclosure, a non-transitory machine readable medium stores a program for transferring network traffic from a first interface to a second interface, which when executed by a processor, causes at least one of a network device, a router, a first interface, and a second interface to request, at a first time, by the network device in a network, a first set of failover information from the first interface, wherein the first interface has a first address and a first port number. The non-transitory machine readable medium causes the network device to, responsive to the request at the first time, receive the first set of failover information from the first interface. The first set of failover information includes the second address and the first port number. The non-transitory machine readable medium causes at least one of the network device, the first interface, and the second interface to detect, at a second time after the first time, a failure on the first interface. The non-transitory machine readable medium cases the router to, responsive to detecting the failure on the first interface, modify, by the router, a network access translation (NAT) table stored within the router. The first address of the first interface is replaced, by the router, with the second address of the second interface, and the first port number remains unchanged.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
  a first interface, wherein the first interface has a first address and a first port number;
  a second interface, wherein the second interface has a second address and a second port number; and
  a router in communication with the first interface and the second interface over a network, wherein the router is configured to:
    request, at a first time, a first set of failover information from the first interface;
    responsive to the request at the first time, receive the first set of failover information from the first interface, wherein the first set of failover information includes the second address and the first port number;
    detect, at a second time after the first, a failure on the first interface; and
    responsive to detecting the failure on the first interface, modify a network access translation (NAT) table stored within the router by replacing the first address of the first interface with the second address of the second interface while retaining the first port number, such that the first port number remains unchanged.

2. The system of claim 1, wherein the router is further configured to:

request, a second set of failover information from the second interface, wherein the second interface has a second address and a second port number; and responsive to the request, receive, the second set of failover information from the second interface, wherein the second set of failover information includes the first address and the second port number.

3. The system of claim 1, wherein a network device includes one of the first interface and the second interface.

4. The system of claim 1, wherein the router is further configured to send a first secure random cookie with the request at the first time and a second secure random cookie with the request at the second time.

5. The system of claim 1, wherein the router is further configured to receive, from the first interface, the first secure random cookie with the response to the request at the first time and receive, from the second interface, the second secure random cookie with the response to the request at the second time.

6. The system of claim 1, wherein the failure is a link failure.

7. The system of claim 1, wherein the failure is a timeout of a keepalive signal sent between the network device and the first interface.

8. The system of claim 1, wherein the failure is a lack of an acknowledgment (ACK) flag in a Transmission Control Protocol (TCP) packet received by the network device from the first interface.

9. A method for transferring network traffic from a first interface to a second interface, comprising:
   requesting, at a first time, by a network device in a network, a first set of failover information from the first interface, wherein the first interface has a first address and a first port number;
   responsive to the request at the first time, receiving, by the network device in the network, the first set of failover information from the first interface, wherein the first set of failover information includes the second address and the first port number;
   detecting, at a second time after the first time, by at least one of the network device, the first interface, and the second interface, a failure on the first interface; and
   responsive to detecting the failure on the first interface, modifying, by a router, a network access translation (NAT) table stored within the router, wherein
      the first address of the first interface is replaced, by the router, with the second address of the second interface, and
      the first port number remains unchanged.

10. The method of claim 9, further comprising:
   requesting, by the network device in the network, a second set of failover information from the second interface, wherein the second interface has a second address and a second port number; and
   responsive to the request, receiving by the network device in the network, the second set of failover information from the second interface, wherein the second set of failover information includes the first address and the second port number.

11. The method of claim 10, wherein requesting at the second time, by the network device, the second set of failover information, includes sending, by the network device, a second secure random cookie with the request at the second time.

12. The method of claim 11, wherein receiving, by the network device, the second set of failover information, includes receiving, from the second interface the second secure random cookie with the response.

13. The method of claim 9, wherein the network device is the router.

14. The method of claim 9, wherein the network device includes one of the first interface and the second interface.

15. The method of claim 9, wherein requesting at the first time, by the network device, the first set of failover information, includes sending, by the network device, a first secure random cookie with the request at the first time.

16. The method of claim 15, wherein receiving, by the network device, the first set of failover information, includes receiving, from the first interface the first secure random cookie with the response.

17. The method of claim 9, wherein the failure is a link failure.

18. The method of claim 9, wherein the failure is a timeout of a keepalive signal sent between the network device and the first interface.

19. The method of claim 9, wherein the failure is a lack of an acknowledgement (ACK) flag in a Transmission Control Protocol (TCP) packet received by the network device from the first interface.

20. A non-transitory machine readable medium storing a program for transferring network traffic from a first interface to a second interface, which when executed by a processor, causes at least one of a network device, a router, a first interface, and a second interface to:
   request, at a first time, by the network device in a network, a first set of failover information from the first interface, wherein the first interface has a first address and a first port number;
   responsive to the request at the first time, receive by the network device in the network, the first set of failover information from the first interface, wherein the first set of failover information includes the second address and the first port number;
   detect, at a second time after the first time, by at least one of the network device, the first interface, and the second interface, a failure on the first interface; and
   responsive to detecting the failure on the first interface, modify, by the router, a network access translation (NAT) table stored within the router, wherein
      the first address of the first interface is replaced, by the router, with the second address of the second interface, and
      the first port number remains unchanged.

* * * * *